Feb. 27, 1940.  R. R. R. SARAZIN  2,191,862
SYSTEM FOR ANALYZING VIBRATIONS
Filed Oct. 22, 1937
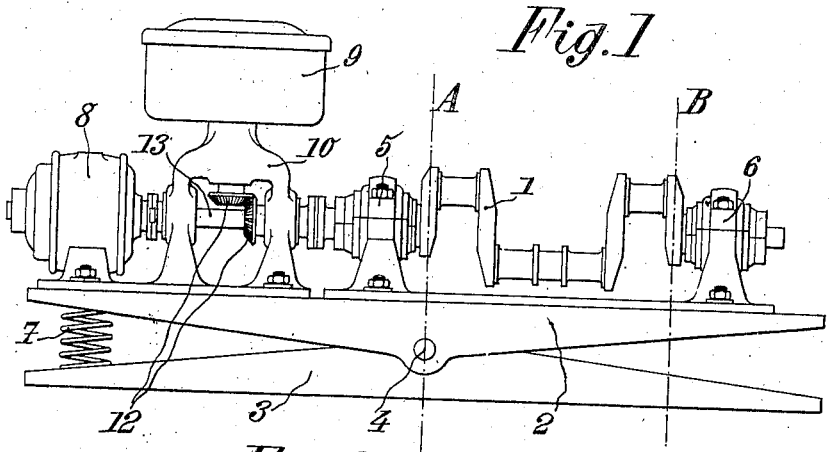
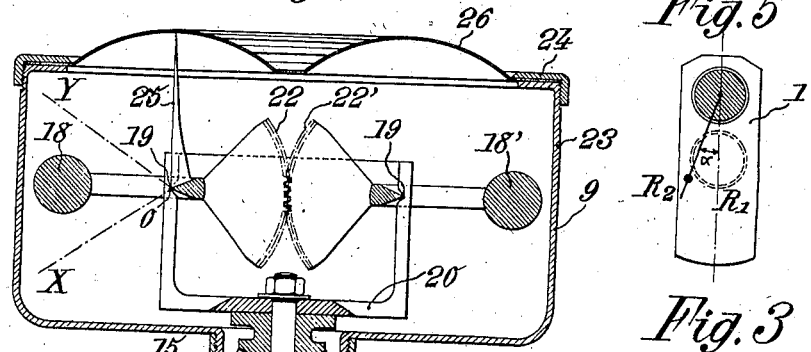
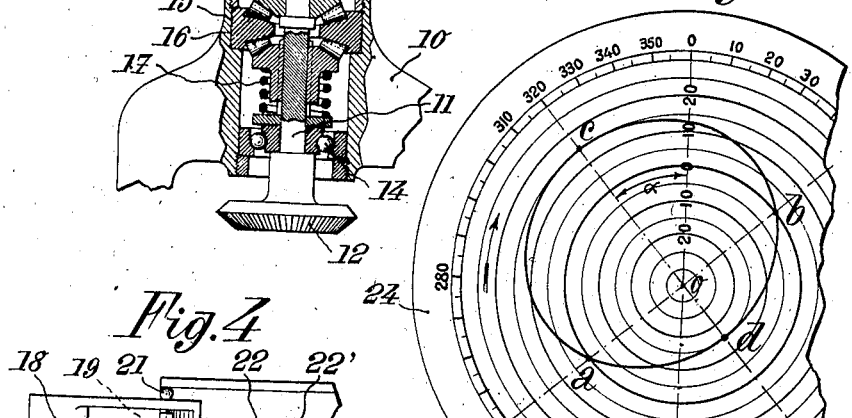
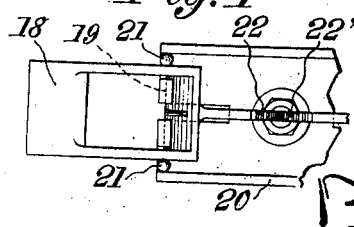
Inventor:
Raoul Roland Raymond Sarazin,
Attorneys Patented Feb. 27, 1940

2,191,862

UNITED STATES PATENT OFFICE 2,191,862

SYSTEM FOR ANALYZING VIBRATIONS

Raoul Roland Raymond Sarazin, Saint-Prix, France

Application October 22, 1937, Serial No. 170,503
In Luxemburg May 7, 1937

21 Claims. (Cl. 73—51)

The present invention relates to systems for analyzing vibrations or impulses capable of giving rise to vibrations, and it is more especially, although not exclusively, concerned with systems for balancing rotary structures, and in particular engine crankshafts.

The chief object of the present invention is to provide a system of this kind which is better adapted to meet the requirements of actual practice than those used up to this time.

According to the essential feature of the present invention, I cause the vibrations to be analyzed (or vibrations produced by the impulses to be analyzed) to act upon an apparatus, which, for the sake of clarity, will be hereinafter called shock-absorber, including a movable part capable of moving, with respect to the remainder of the apparatus, in consequence of its inertia, when said apparatus is subjected to certain impulses, and I combine with said movable part an indicator system adapted to mark the displacements of said movable part as a function of one of the variables which determine said vibrations, for instance, in the case of an unbalanced rotary structure, as a function of the angular position of the unbalanced weight which is the cause of the lack of balance of the whole structure.

Other features of the present invention will result from the following detailed description of some specific embodiments thereof.

Preferred embodiments of the present invention will be hereinafter described, with reference to the accompanying drawing, given merely by way of example, and in which:

Fig. 1 is a general elevational view of the apparatus, made according to the invention, for balancing a crankshaft;

Fig. 2 is a vertical axial section view of a part of this apparatus;

Fig. 3 is a plan view, on a larger scale, corresponding to Fig. 2;

Fig. 4 is a partial plan view, some parts being removed, corresponding to Fig. 2;

Fig. 5 is a diagram intended to facilitate the understanding of the invention.

In the following description, it will be supposed that it is desired to balance a rotary structure, consisting in the example illustrated by the drawing, of a crankshaft, which is out of balance. According to the invention, I proceed in the following manner:

It is known that, at the present time, use is made, for effecting this balancing, of a system including a frame 2 capable of oscillating with respect to a stationary support 3 about a transverse axis 4. This frame 2 carries bearings 5 and 6 having a common axis at right angles to axis 4, which bearings are adapted to receive a crankshaft 1, for instance at the end journals thereof.

A spring 7 or the like keeps, in the state of rest, frame 2 in the desired position.

A motor 8 is adapted to drive crankshaft 1, mounted in bearings 5 and 6, so that the lack of balance of said crankshaft produces oscillation of the frame 2 about axis 4.

One of the usual methods of balancing a crankshaft consists in choosing on said crankshaft 1 two planes A and B, at right angles to the axis thereof, in which the unbalancing will be eliminated.

According to this method, one of these planes, for instance plane A, is first caused to pass through axis 4, and one proceeds by trial and error, by displacing a suitable mass on a support turning together with the crankshaft, to determine the importance and the relative angular position of the unbalanced mass which is the cause of the lack of balance of the crankshaft. When this is done, this partial unbalance is eliminated by adding or removing a mass to, or from, the crankshaft, at a suitable point of plane B.

The inverse operation is then carried out, that is to say plane B is caused to pass through axis 4, and the unbalance remaining in plane A is corrected in the same manner.

This method is necessarily long and delicate since it is conducted by trial and error.

The system according to the present invention permits of improving and simplifying the method and immediately determining the importance and the angular position of the unbalances in planes A and B.

For this purpose, I make, for instance, use of the same apparatus as just above described, but I complete it in the following manner:

I fix to frame 2 (at a point preferably remote from axis 4 so that an angular displacement, even of small amplitude of frame 2 corresponds to a substantial linear displacement of said point) a vibration absorber 9 of the type above referred to, the fixation of this vibration absorber to frame 2 being made in such manner that the relative displacement of the movable part of the vibration absorber with respect to the remainder of said apparatus has at least one component in the direction of the displacement imparted to said apparatus by the oscillations of the frame.

And I cause this movable part to coact with an indicator system permitting to mark, as a function of the angular position of the unbalanced mass, the displacements of this movable part.

I may, of course, distribute in many different manners, the devices which are to be mounted on shaft 2. In particular, if it is desired to increase the sensitiveness of the apparatus for absorbing vibrations, I may position it as far as possible from the neutral plane (plane at right angles to the axis of the crankshaft and passing through axis 4), either on the same side of said plane as the crankshaft, or on the opposite side, these two solutions differing merely by an angular difference of 180° in the action of the unbalanced mass upon the movable part of the shock absorber, said movable part being advantageously driven in rotation by the crankshaft 1, and at the same speed as the latter.

Concerning the vibration absorber 9, it may advantageously consist of a balanced structure turning about an axis which will be positioned at right angles to the axis of the crankshaft and including radial pendulums free to turn about their respective axes under the action of the centrifugal force and of the displacements imparted to said axes.

Therefore, if said axes remain in fixed position, which will be the case if no unbalance exists, the pendulums will themselves remain stationary with respect to their rotary support, whereas, if said axes are caused to vibrate, as a consequence of a vibration of the axis of revolution of the rotary part in its own direction, the pendulums will oscillate with the frequency of the vibration acting thereon, that is to say with a frequency equal to 1 with respect to the speed of revolution of the crankshaft, if the vibration absorber is revolving at this speed.

Such an apparatus can, for instance, be made as shown by the appended drawing.

In this embodiment of the invention, I provide a support 10 carried by frame 2, and in this support is journalled a vertical shaft 11 driven, through the intermediate of bevel gears 12, by the shaft 13 which connects motor 8 with crankshaft 1.

I interpose, between support 10 and vertical shaft 11, a guiding ball bearing 14, and thrust bearings 15 and 16, for instance of the conical roller type, acting in opposite directions and subjected to the action of a spring 17 capable of preventing any axial play from existing between shaft 11 and support 10.

Shaft 11 is provided with oscillating masses or pendulums which consist, for instance, of two pivoting masses 18 and 18', diametrally opposed, adapted to pivot, through the intermediate of horizontal knife-edges 19, with respect to a part 20 fixed to the upper part of shaft 11, balls 21 being advantageously interposed, along the axis of said knife-edges, between elements 18 and 18' on the one hand, and the inner walls of said part 20 on the other hand.

Advantageously, the movements of oscillating elements 18 and 18' are synchronized by providing them, on the side opposed to their center of gravity, with toothed sectors 22, 22' arranged to mesh with each other, which permits to obviate the perturbing effect due to slight angular displacements of frame 2.

Finally, I preferably dispose the whole of the parts which have just been described on the inside of a circular case 23 fixed to support 10 and provided with a lid or cover 24, which will be more specifically described in what follows with reference to the indicator system which is to cooperate with the vibration absorbing means.

As above stated, when such a vibration absorbing device is subjected to the vibrations of frame 2, pivoting elements 18 and 18' start oscillating between two extreme positions, which have been shown at OX and OY for element 18. In other words, and according to the known theory of pendular vibration dampers (see for example Patent No. 2,137,591), when the shaft 11 begins to vibrate axially under the influence of vibrations exerted on the frame, the elements 18 and 18' are affected by this vibration and oscillate in phase opposition to the axial vibration of the shaft 11. They then undergo an oscillating movement of such amplitude that the reactions which they exert on the said shaft 11 tend to damp the axial vibrations thereof. The amplitude of their oscillating movement will depend, as is well known, on the force of the vibrations.

They make a full oscillation in a period of time corresponding to a revolution of shaft 11 and crankshaft 1, and the acceleration exerted at any time on said pivoting elements will characterize the perturbing action of the unbalanced mass, at the time that is considered, on the part of frame 2 on which the vibration absorber is mounted. This action will be of the sinusoidal kind and it will be maximum for the extreme positions of pivoting elements 18 and 18', becoming equal to zero for the horizontal positions of said pivoting elements.

Concerning now the indicator system, it will be, of course, necessary, when devising it, to take into account the type of vibration absorber that is being used, since this indicator system is to coact with said vibration absorber.

In particular, in the case of a vibration absorber of the type of that just above described, I may provide an indicator system which indicates the relation existing between the perturbing action of the unbalanced mass and the positive or negative angle made by pivoting elements 18 and 18' with the horizontal plane passing through their axes of oscillation. I have found that, in this case, it is advantageous to have recourse to the embodiment illustrated by the drawing. In this embodiment, one of the pivoting elements 18, 18' carries an index or pointer which is adapted to coact with fixed graduations, permitting to mark, at any time, the inclination of said pivoting elements and their angular position.

For this purpose, for instance, as shown by the drawing, pivoting element 18 carries a needle 25 extending in a direction substantially at right angles to that of said pivoting element.

The cover 24 is arranged in such manner as to include a transparent part 26, forming a tore-shaped cap, which carries, on the one hand, an angular graduation in degrees or in grades, and, on the other hand, a radial graduation which permits of noting the inclination of the pivoting elements on either side of their position of equilibrium, which corresponds to the circle marked zero.

I have thus provided an apparatus for obtaining the dynamic balancing of crankshaft 1 the mechanical operation of which results sufficiently clearly from the above description for making it unnecessary to add any explanation.

As for the indications supplied by this apparatus, they are utilized in the following manner, for determining, through the two successive operations above mentioned, the characteristics of the correcting masses intended to obtain a good balancing in planes A and B respectively.

As a consequence of the synchronism existing between the oscillations of pivoting element 18 and the rotary driving movement of shaft 11, the point of needle 25 describes a closed curve which intersects circle O at two points $a$ and $b$ diametrally opposed to each other (Fig. 3) and which passes through a maximum and a minimum, respectively, in two points $c$ and $d$, both located upon a line at right angles to the straight line passing through $a$ and $b$. Point $c$ corresponds to the passage of the unbalanced mass in its lower position, and point $d$ corresponds to the passage of said unbalanced mass in its upper position, if the vibration absorber is supposed to be located on the opposite side of axis 4 with respect to the unbalanced mass which is to be determined.

If care has been taken, at the beginning of the operation, of giving the crankshaft a well determined angular position, for instance by placing one of the crank arms vertically, and of bringing at the same time the needle on the radius passing through the O of the angular graduation, it is possible to ascertain the angular position of the unbalanced mass.

This determination is based upon the fact that, when needle 25 is on $c$, the unbalanced mass is located on a vertical radius shown at $R_1$ in Fig. 5.

When the crank arm above mentioned is vertical, the needle must have come back on the angular graduation marked zero and, consequently, if the direction of rotation of the vibration absorber is that indicated by the arrow in the drawing, the unbalanced mass will be located on a radius $R_2$ making with radius $R_1$ the same angle $\alpha$ as that made by straight line O$c$ with the angular graduation zero.

Concerning now the mass to be added or removed along this radius $R_2$ in order to ensure the balancing of the crankshaft in the plane A or B that is considered, it is determined by taking into account the importance of the radial distance of point $c$, which distance indicates the maximum value of the perturbing action of the unbalanced mass upon the portion of support 2 to which the vibration absorber 9 is secured.

One can then fix, for reasons of construction, the eccentricity of the unbalanced mass, and determine its value in such manner that its action, considered with reference to the neutral plane (product of its mass and of its eccentricity and of its distance to said plane) may be identical to the perturbing action indicated by the radial distance of point $c$.

I might also proceed in a different manner with similar means, for obtaining the dynamic balancing of a crankshaft.

For instance, after having determined the position of the center of gravity of the crankshaft (which is supposed to be statically balanced), I might bring this center of gravity into the neutral plane and determine, through a single operation, conducted as just above described, the residual unbalanced mass which perturbs the dynamic balancing of the crankshaft in question.

In any case, and whatever be the particular method that is adopted, the apparatus above described has many considerable advantages over systems used previously. In particular it permits of quickly and accurately obtaining the dynamic balancing of the crankshaft 1.

I might also provide other applications of the invention.

For instance, I might dispose a system consisting of a vibration absorber, fitted with its indicator device at a point of a member vibrating under the action of an engine, for instance on a wing of an aircraft, and determine the importance of the stresses developed in the vibratory movement, for different working speeds of the engine.

I might also utilize such an apparatus for determining the frequency of a vibratory movement. It would suffice, for this purpose, to drive the movable part of the vibration absorber at different speeds successively. The point of needle 25 would describe a stationary closed curve only when synchronism exists between the speed of revolution of said movable part and the frequency of its vibratory movement, or an harmonic frequency, the appearance of the curve indicating in this case whether it corresponds to the frequency proper or to an harmonic thereof.

In a general manner, while I have, in the above description, disclosed what I deem to be practical and efficient embodiments of the present invention, it should be well understood that I do not wish to be limited thereto as there might be changes made in the arrangement, disposition, and form of the parts without departing from the principle of the present invention as comprehended within the scope of the appended claims.

What I claim is:

1. An apparatus of the type described for studying the vibrations of a structure under the effect of means for driving said structure, which comprises, in combination, a stationary support, a frame movably carried by said support, elastic means for urging said frame toward a predetermined position with respect to said support, said frame being adapted to carry said structure, a vibration absorber including a part rigidly connected to said frame, so that the vibrations of said structure are transmitted to said part, and a part, operatively connected to said driving means, so as to be movable with respect to said first mentioned part in response both to the effect of its own inertia and to the action of said driving means, and indicating means associated with said movable part for marking the relative displacements thereof with respect to said first mentioned part.

2. An apparatus of the type described for studying the vibrations of a rotating structure under the effect of means for driving said structure, which comprises, in combination, a stationary support, a frame movably carried by said support, elastic means for urging said frame toward a predetermined position with respect to said support, journals on said frame for supporting said rotating structure, a vibration absorber including a part rigidly connected to said frame so that the vibrations of said structure are transmitted to said part and a part rotatable with respect to said first mentioned part adapted to be driven by said driving means, said second mentioned part being further movable with respect to said first mentioned part under the effect of its own inertia, and indicating means associated with said second mentioned part for marking the relative displacements thereof with respect to said first mentioned part.

3. An apparatus of the type described for studying the vibrations of a rotating structure, which comprises, in combination, a stationary support, a frame movably carried by said support, elastic means for urging said frame toward a predetermined position with respect to said support, bearings on said frame for supporting said rotating structure, a motor carried by said frame for driving said rotating structure, a vibration absorber including a part rigidly connected to said frame so that the vibrations of said structure are transmitted to said part, and a part rotatable with respect to said first mentioned part operatively connected to said motor so as to be driven by it, said second mentioned part being further movable with respect to said first mentioned part under the effect of its own inertia, and indicating means associated with said second mentioned part for marking the relative displacements thereof with respect to said first mentioned part.

4. An apparatus of the type described for studying the balancing of a crankshaft, which comprises, in combination, a stationary support, a movable frame pivoted to said support about an axis, elastic means for urging said frame toward a predetermined angular position with respect to said support, two bearings, carried by said frame in line with each other and at right angles to said axis, for supporting said crankshaft, a motor carried by said frame for driving said crankshaft, a vibration absorber including a part rigidly mounted on said frame so that the vibrations of said crankshaft are transmitted to said part and a part rotatable with respect to said first mentioned part operatively connected to said motor so as to be driven by it, said second mentioned part being further movable with respect to said first mentioned part under the effect of its own inertia, and indicating means associated with said second mentioned part for marking the relative displacements thereof with respect to said first mentioned part.

5. An apparatus of the type described for studying the balancing of a rotating structure, which comprises, in combination, a stationary support, a movable frame pivoted to said support about an axis, elastic means for urging said frame toward a predetermined angular position with respect to said support, bearing means carried by said frame at right angles to said axis, for supporting said rotating structure, driving means for rotating said rotating structure, a vibration absorber including a casing rigidly mounted on said frame so that the vibrations of said rotating structure are transmitted to said casing, a shaft at right angles to the axis of said rotating structure journalled in said casing, connecting means interconnecting said shaft with said rotating means, at least one pendular mass pivotally carried by said shaft about an axis at right angles to the direction of said shaft, and indicator means operatively connected with said pendular mass for marking the relative displacements thereof with respect to said casing.

6. An apparatus of the type described for studying the balancing of a rotating structure, which comprises, in combination, a stationary support, a movable frame pivoted to said support about an axis, elastic means for urging said frame toward a predetermined angular position with respect to said support, bearing means carried by said frame at right angles to said axis, for supporting said rotating structure, driving means for rotating said rotating structure, a vibration absorber including a casing rigidly mounted on said frame so that the vibrations of said rotating structure are transmitted to said casing, a shaft at right angles to the axis of said rotating structure journalled in said casing, connecting means for interconnecting said shaft with said rotating means, at least one pendular mass pivotally carried by said shaft about an axis at right angles to the direction of said shaft, a dial in the form of a portion of a tore carried by said casing in coaxial relation with said shaft, and a needle carried by said pendular mass adapted to cooperate with said dial, for marking the relative displacements of said pendular mass with respect to said casing.

7. An apparatus of the type described for studying the balancing of a rotating structure which comprises, in combination, a stationary support, a movable frame pivoted to said support about an axis, elastic means for urging said frame toward a predetermined angular position with respect to said support, bearing means carried by said frame at right angles to said axis, for supporting said rotating structure, driving means for rotating said rotating structure, a vibration absorber including a tubular casing rigidly mounted on said frame at right angles to the direction of the axis of said rotating structure, so that the vibrations of said rotating structure are transmitted to said casing, a shaft at right angles to the axis of said rotating structure journalled in said casing, connecting means for interconnecting said shaft with said rotating means, two pendulums pivotally carried by said shaft about parallel axes at right angles to the direction of said shaft, said pendulums being diametrally opposed with reference to the axis of said shaft, intermeshing toothed sectors carried by said pendulums for angularly interconnecting them, a dial in the form of a portion of a tore carried by said casing in coaxial relation with said shaft, and a needle carried by one of said pendulums adapted to cooperate with said dial for indicating thereon a curve corresponding to the relative displacements of said pendulums with respect to said casing.

8. An apparatus according to claim 7 further including a hollow structure carried by the upper end of said shaft and provided with two parallel horizontal grooves in their opposite inner walls, said pendulums including a knife edge respectively, engaging in said grooves, respectively 9. An apparatus according to claim 7 in which said casing surrounds both of these pendulums and said dial constitutes the cover of said casing.

10. An apparatus for analyzing vibrations including a frame, a shaft rotatably supported in said frame for axial movement with the frame in such a manner that the vibrations of said frame produce a displacement of said shaft in the direction of its axis, means for rotating said shaft, a pendular system, means connecting said system to said shaft for rotation therewith so that the system may oscillate with respect to said shaft in the direction of the axis of the same, the natural period of said pendular system in the field of centrifugal force resulting from the rotation of the shaft being substantially the same as the period of the vibrations of said frame, and means to indicate the amplitude of oscillations of the pendular system.

11. An apparatus according to claim 10, in which the natural period of the pendular system is such that the system undergoes a given whole number of oscillations for a given whole number of revolutions of the shaft.

12. An apparatus for analyzing the unbalance of a rotating body comprising a frame mounted to vibrate when submitted to vibrations, means on said frame for rotatably supporting the said rotating body, means to impart rotary movement to the rotating body when it is held by said supporting means, a shaft rotatably supported on the frame for axial movement with the frame in such a manner that the vibrations of said frame produce a displacement of said shaft in the direction of its axis, means to drive said shaft at a speed proportional to that of the rotating body, a pendular system connected to said shaft for rotation therewith so that said system may oscillate with said shaft in a direction parallel to the axis of the same, the natural period of said pendular system in the field of centrifugal force resulting from the rotation of the shaft being such that its oscillation is in resonance with the vibration transmitted to the shaft by the unbalance of the rotating body and that it undergoes a given whole number of oscillations for a given whole number of revolutions of the shaft, and means to indicate the amplitude and the angular setting of the oscillations of the said pendular system and thereby the value and the angular location of unbalance of the rotating body.

13. An apparatus for analyzing vibrations including a frame, a shaft rotatably supported in said frame for axial movement with the frame in such a manner that the vibrations of said frame produce a displacement of said shaft in the direction of its axis, means for rotating said shaft, a pendular system, means connecting said system to said shaft for rotation therewith so that the system may oscillate with respect to said shaft in the direction of the axis of the same, and means to indicate the amplitude of oscillations of the pendular system.

14. An apparatus according to claim 13, in which the pendular system comprises a plurality of pendulums pivoted with respect to the shaft.

15. An apparatus according to claim 13, in which the pendular system comprises a plurality of pendulums pivoted with respect to the shaft, and means connecting said pendulums to synchronize the movement thereof.

16. An apparatus according to claim 13, further comprising an index, and means connecting the pendular system to said index so as to impart thereto oscillations which are periodical and proportional in number to the angular speed of the shaft, said index describing a closed curve.

17. An apparatus according to claim 13, further comprising an index, and means connecting the pendular system to said index so as to impart thereto oscillations which are periodical and proportional in number to the angular speed of the driven shaft, said index describing a closed curve, said index being mounted on one of said pendulums, and a transparent cover in the form of a portion of a torus adjacent the end of said index.

18. An apparatus for analyzing the unbalance of a rotating body comprising a frame mounted to vibrate when submitted to vibrations, means on said frame for rotatably supporting the said rotating body, means to impart rotary movement to the rotating body when it is held by said supporting means, a shaft rotatably supported on said frame for axial movement with the frame in such a manner that the vibrations of said frame produce a displacement of said shaft in the direction of its axis, means to drive said shaft at a speed proportional to that of the rotating body, a pendular system connected to said shaft for rotation therewith so that said system may oscillate with said shaft in a direction parallel to the axis of the same, and means to indicate the amplitude and the period of the oscillations of the said pendular system and thereby the value and the period of unbalance of the rotating body.

19. An apparatus according to claim 13, further comprising an index, and means connecting the pendular system to said index so as to impart thereto oscillations which are periodical and proportional in number to the angular speed of the driven shaft, said index describing a closed curve, said index being mounted on one of said pendulums, and a transparent cover in the form of a portion of a torus adjacent the end of said index, said transparent cover carrying a plurality of radial graduations and a plurality of concentric circular graduations.

20. An apparatus according to claim 13, further including elastic means for eliminating axial play between said frame and the shaft rotatably supported therein.

21. An apparatus according to claim 13, in which the pendular system comprises a plurality of pendulums, and a hollow structure carried by the upper end of said shaft and provided with two parallel horizontal grooves in its opposite inner walls, said pendulums each including a knife edge engaging in said grooves respectively.

RAOUL ROLAND RAYMOND SARAZIN.